(12) United States Patent
Ogawa

(10) Patent No.: US 8,774,458 B2
(45) Date of Patent: Jul. 8, 2014

(54) IMAGE PROCESSING APPARATUS, IMAGE PROCESSING METHOD, RECORDING MEDIUM, AND PROGRAM

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 219 days.

(21) Appl. No.: 13/354,852

(22) Filed: Jan. 20, 2012

(65) Prior Publication Data

US 2012/0243737 A1 Sep. 27, 2012

(30) Foreign Application Priority Data

Mar. 25, 2011 (JP) ................................ 2011-067138

(51) Int. Cl.
*G06K 9/00* (2006.01)
(52) U.S. Cl.
USPC ....................................................... 382/103
(58) Field of Classification Search
USPC .................... 382/103, 118, 190, 201; 348/51, 348/E13.075
See application file for complete search history.

(56) References Cited

U.S. PATENT DOCUMENTS

| | | | |
|---|---|---|---|
| 5,528,698 A * | 6/1996 | Kamei et al. .................. | 382/100 |
| 8,085,996 B2 | 12/2011 | Ogawa | |
| 2008/0085037 A1* | 4/2008 | Segawa et al. ................ | 382/118 |
| 2009/0010501 A1 | 1/2009 | Ogawa | |
| 2009/0046900 A1 | 2/2009 | Ogawa | |
| 2009/0087038 A1 | 4/2009 | Okada et al. | |
| 2009/0304230 A1* | 12/2009 | Krahnstoever et al. ....... | 382/103 |

FOREIGN PATENT DOCUMENTS

WO WO 2009/148702 A1 12/2009

OTHER PUBLICATIONS

Babenko et al ("Visual Tracking with Online Multiple Instance Learning", IEEE, Jun. 20, 2009, pp. 983-990).*
Extended European Search Report issued Jun. 12, 2012, in European Patent Application No. 12159800.7.
Boris Babenko, et al., "Visual Tracking with Online Multiple Instance Learning", Computer Vision and Pattern Recognition, 2009. CVPR 2009., XP-031607264, Jun. 20, 2009, pp. 983-990.
Alper Yilmaz, et al., "Object Tracking: A Survey", ACM Computing Surveys, vol. 38, No. 4, XP-040049886, Dec. 2006, pp. 1-45.
Paul Viola, et al., "Multiple Instance Boosting for Object Detection", NIPS 2005—19$^{th}$Annual Conference on Neural Information Processing Systems, XP-002589569, Dec. 5, 2005, 8 pages.
Shai Avidan, "Ensemble Tracking",Mitsubishi Electric Research Laboratories, IEEE International Conference on Computer Vision and Pattern Recognition (CVPR), 2005, 10 pages.

* cited by examiner

*Primary Examiner* — Amara Abdi
(74) *Attorney, Agent, or Firm* — Sony Corporation

(57) ABSTRACT

An image processing apparatus includes: a calculating unit that calculates an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a first frame, when the mixing ratio is varied and obtaining the mixing ratio when the evaluation value is maximum; and a detecting unit that detects an image corresponding to the target image of a second frame based on the confidence degrees in which the mixing ratio is set when the evaluation value is the maximum.

12 Claims, 5 Drawing Sheets

IMAGE PROCESSING APPARATUS, IMAGE PROCESSING METHOD, RECORDING MEDIUM, AND PROGRAM

BACKGROUND

The present technology relates to an image processing apparatus, an image processing method, a recording medium, and a program, and more particularly, to an image processing apparatus, an image processing method, a recording medium, and a program capable of tracking an image with a low load.

Many digital cameras have an autofocus function of automatically focusing a subject. The autofocus function enables users to reliably image a subject in a focused state when the users execute a simple operation of operating a release switch, facing a camera to the subject.

When the digital cameras also have a tracking function, a subject is automatically tracked even in a case where the subject moves. Accordingly, the users can image the subject in the focused state.

For example, "Ensemble Tracking" by Shai Avidan, Mitsubishi Electric Research Labs, 201 Broadway Cambridge, Mass. 02139, avidan@merl.com discloses a technique of automatically tracking a subject.

SUMMARY

In the technique disclosed in "Ensemble Tracking" by Shai Avidan, Mitsubishi Electric Research Labs, 201 Broadway Cambridge, Mass. 02139, avidan@merl.com, the calculation amount is massive since a boosting technique is used. Therefore, it is difficult to apply this technique to digital cameras as consumer image processing apparatuses.

It is desirable to provide a technique capable of tracking an image with a low load.

According to an embodiment of the present technology, there is provided an image processing apparatus including: a calculating unit that calculates an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a first frame, when the mixing ratio is varied and obtains the mixing ratio when the evaluation value is maximum; and a detecting unit that detects an image corresponding to the target image of a second frame based on the confidence degrees in which the mixing ratio is set when the evaluation value is the maximum.

The first and second frames may be one of an odd frame and an even frame and the other thereof.

The image processing apparatus may further include a computing unit that sets a scan image in a scan region on the second frame as the comparison image and calculates the confidence degree between the target image and the scan image.

The detecting unit may detect the scan image, in which the confidence degree between the target image and the scan image are the maximum, as an image corresponding to the target image.

The calculating unit may set an image in a reference region on the first frame as the target image, set a plurality of regions containing at least a part of the target image in the reference region as positive regions, set a plurality of regions containing no target image in the reference region as negative regions, calculate first confidence degrees which are the confidence degrees between the target image in the reference region and the images in the plurality of positive regions, calculate second confidence degrees which are the confidence degrees between the target image in the reference region and the images in the plurality of negative regions, calculate a first sum of products which is a sum of products of the first confidence degrees and a first weight coefficient of the positive regions, calculate a second sum of products which is a sum of products of the second confidence degrees and a second weight coefficient of the negative regions, and calculate a sum of the first sum of products and the second sum of products as the evaluation value.

The first weight coefficient may be a value obtained by dividing a constant by the number of positive regions and the second weight coefficient may be a value obtained by dividing the constant by the number of negative regions.

The calculating unit may calculate the evaluation value for a third frame subsequent to the second frame by setting an image in a region, which corresponds to coordinates of an image corresponding to the target image of the second frame, and in a region on the third frame as the new target image and obtain the mixing ratio when the evaluation value is the maximum. The detecting unit may detect an image corresponding to the new target image of the third frame on a fourth frame subsequent to the third frame based on the confidence degrees in which the mixing ratio is set when the evaluation value is the maximum based on the image on the third frame.

The image processing apparatus may further include a display unit that displays a marker on a region corresponding to coordinates of the image corresponding to the target image.

The image processing apparatus may further include a driving unit that drives a camera so that the image corresponding to the target image is located at a predetermined position on a screen.

The first feature quantity may be luminance information and the second feature quantity may be color information.

An image processing method, a recording medium, and a program according to embodiments of the present technology are an image processing method, a recording medium, and a program corresponding to the image processing apparatus described in the embodiment of the present technology.

According to an embodiment of the present technology, an evaluation value is calculated, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a predetermined frame, when the mixing ratio is varied. The mixing ratio is obtained when the evaluation value is the maximum. An image corresponding to the target image is detected based on the confidence degrees in which the mixing ratio is set when the evaluation value is the maximum.

According to the embodiments of the present technology, it is possible to track an image with a low load.

DETAILED DESCRIPTION OF EMBODIMENTS

Figure 1:
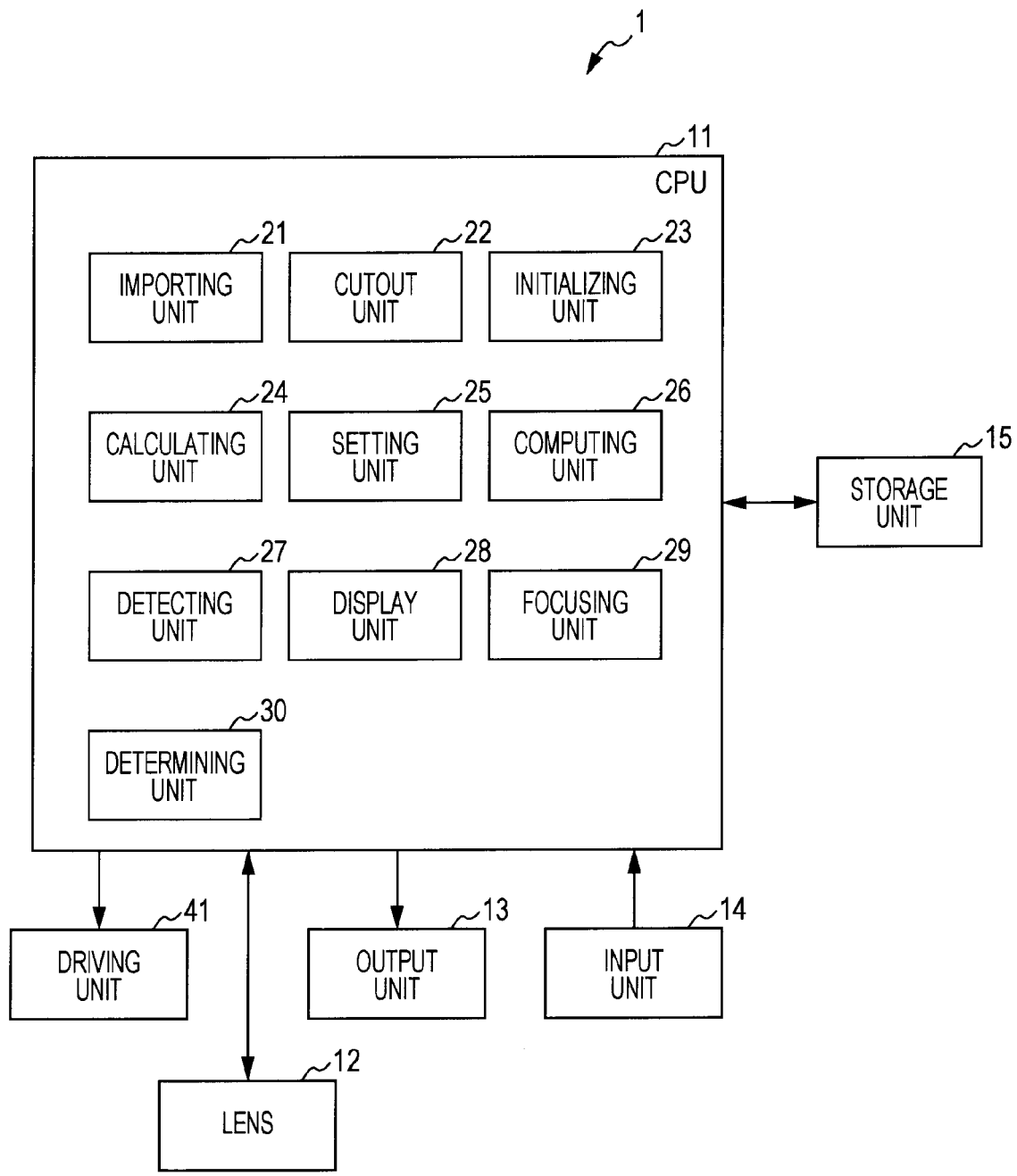
FIG. 1 is a block diagram illustrating the configuration of a digital camera according to an embodiment of the present technology.

FIG. 1 is a block diagram illustrating the configuration of a digital camera 1 according to an embodiment of the present technology. The digital camera 1 includes a CPU (Central Processing Unit) 11, a lens 12, an output unit 13, an input unit 14, and a storage unit 15.

The CPU 11 executes various processes. The lens 12 images a subject and supplies the image data to the CPU 11. The output unit 13 is configured by, for example, an LCD (Liquid Crystal Display) and displays the image captured by the lens 12. The output unit 13 includes a speaker so as to output a necessary warning sound or the like. The input unit 14 includes a release switch operated by a user and members adjusting a shutter speed and an exposure time. The storage unit 15 stores the captured-image data or stores programs or the like executed by the CPU 11.

A driving unit 41 pans and tilts the digital camera 1 in a predetermined direction in a state where the camera 1 is mounted on a predetermined stand (not shown).

The CPU 11 includes the functional blocks of an importing unit 21, a cutout unit 22, an initializing unit 23, a calculating unit 24, a setting unit 25, a computing unit 26, a detecting unit 27, a display unit 28, a focusing unit 29, and a determining unit 30. The respective units can transmit and receive signals, as necessary.

The importing unit 21 imports an image. The cutout unit 22 cuts out predetermined portions from the imported image. The initializing unit 23 initializes a coefficient. The calculating unit 24 executes calculation of each portion. The setting unit 25 sets the coefficient. The computing unit 26 executes calculation of each portion. The detecting unit 27 detects a position. The display unit 28 displays a marker. The focusing unit 29 executes focus adjustment. The determining unit 30 executes various kinds of determination.

In this embodiment, each unit is functionally configured when each unit executes a program. However, each unit may, of course, be configured as hardware.

Figure 2:
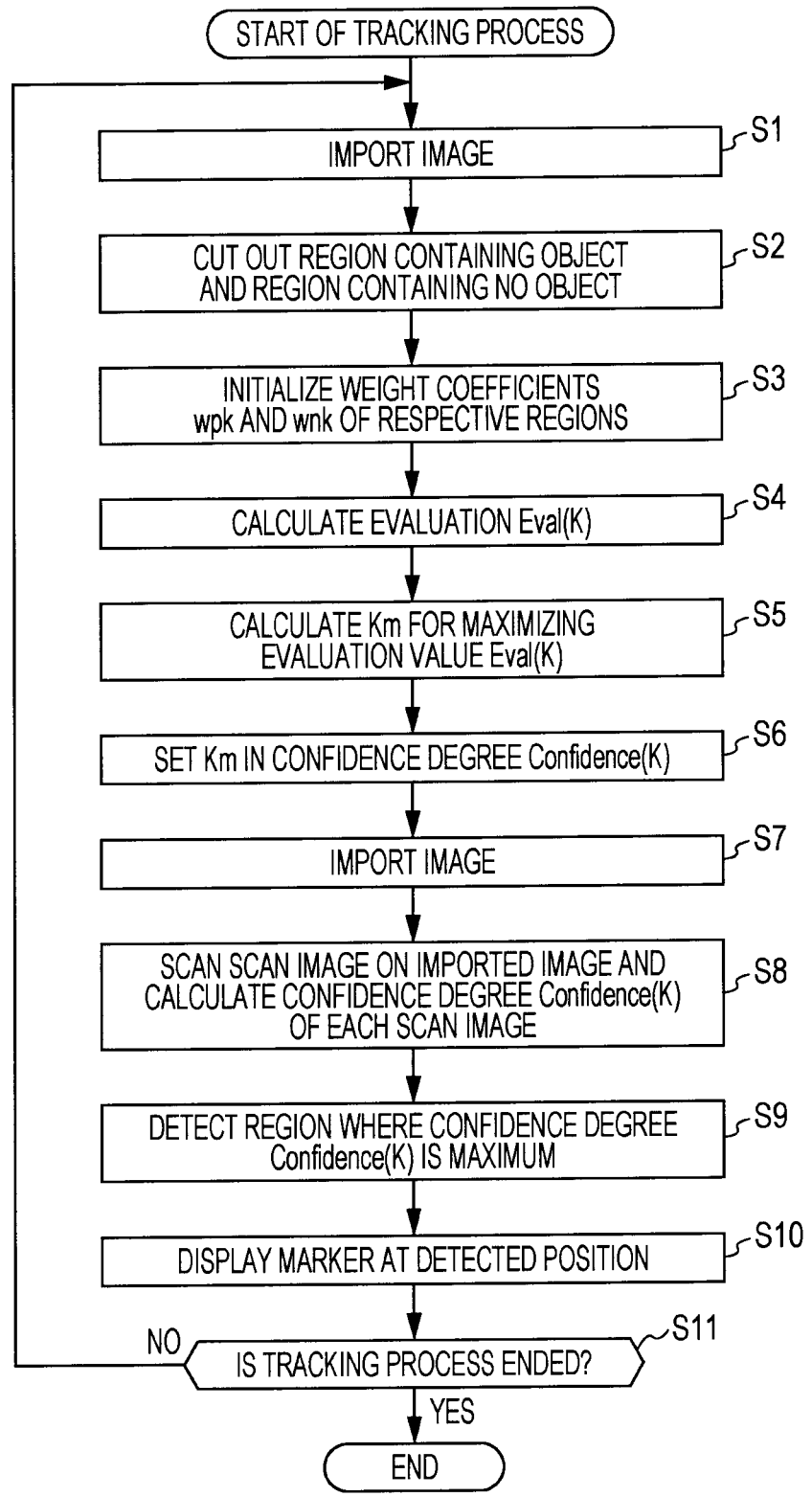
FIG. 2 is a flowchart illustrating a tracking process.

FIG. 2 is a flowchart illustrating a tracking process. Hereinafter, the tracking process of the digital camera 1 will be described with reference to FIG. 2.

In step S1, the importing unit 21 imports an image. That is, the importing unit 21 imports an image of a predetermined frame F1 of the image captured by the lens 12. The image captured by the lens 12 and stored in the storage unit 15 is imported.

In step S2, the cutout unit 22 cuts out regions including an object and regions including no object from the image in the frame imported in the process of step S1. The object is an image desired to be tracked by the user. For example, the object is the face of a subject. A process of cutting out the face will be described with reference to FIG. 3.

Figure 3:
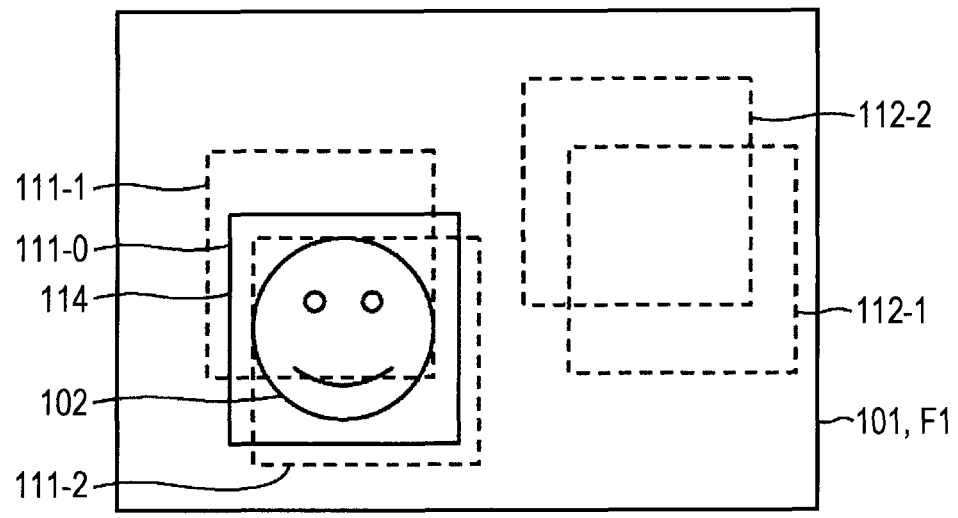
FIG. 3 is a diagram illustrating a process of cutting out regions.

FIG. 3 is a diagram illustrating the process of cutting out the regions. As shown in FIG. 3, an object 102 is displayed on a frame 101 (corresponding to a frame F1) imported through the process of step S1. For example, a rectangular region containing the object 102 is assumed to be a reference region 111-0. An image within the reference region 111-0 is assumed to be a target image 114. When a marker 231 is displayed on a subsequent frame 201 (corresponding to a frame F2) through a process of step S10 described below (see FIG. 6 described below), a region, which corresponds to the coordinates of the marker 231 on the frame 201, on the frame 101 is assumed to be the reference region 111-0. In the initial frame which is not subjected to the process of step S10, a rectangular region centering a point designated when the user operates the input unit 14 is assumed to be the reference region 111-0.

In step S2, regions 111-1, 111-2, . . . , and 111-Np containing at least a part of the target image 114 in the reference region 111-0 are cut out. That is, the Np regions are cut out as positive regions containing the target image 114 in the reference region 111-0. Likewise, regions 112-1, 112-2, . . . , and 112-Nn containing no target image 114 in the reference region 111-0 are cut out. That is, the Nn regions are cut out as negative regions containing no target image 114 in the reference region 111-0.

Next, in step S3, the initializing unit 23 initializes weight coefficients $w_P$ and $w_N$ of the respective regions. The weight coefficients $w_P$ and $w_N$ are expressed by Equation (1) below. The weight coefficient $w_P$ is a weight coefficient of the positive region 111-J (where J=1, 2, . . . , Np) and the weight coefficient $w_N$ is a weight coefficient of the negative region 112-J (where, J=1, 2, . . . , Nn).

$$w_P = \frac{G_P}{N_P}$$

$$w_N = \frac{G_n}{N_n} \qquad (1)$$

As expressed in Equation (1), the weight coefficient $w_P$ of the positive region is a value obtained by dividing a constant $G_P$ by the number Np of positive regions and the weight coefficient $w_N$ of the negative region is a value obtained by dividing a constant $G_N$ by the number Nn of the negative regions. The value of the weight coefficient $w_P$ of the negative region is the same in each region 111-J. Likewise, the value of the weight coefficient $w_N$ of the negative region is the same in each region 112-J. The values of the constants $G_P$ and $G_N$ are determined in advance at the factory shipment of the digital camera 1.

Both values of the constants $G_P$ and $G_N$ are set to 0.5. Alternatively, the value of the constant $G_P$ may be set to 0.8 and the value of the constant $G_N$ may be set to 0.2. Between the weight coefficients $w_P$ and $w_N$, the weight becomes strong when the corresponding constant is set to be larger. By setting the values of the constants $G_P$ and $G_N$ to predetermined values, the balance of the weight coefficients $w_P$ and $w_N$ can be appropriately adjusted.

In step S4, the calculating unit 24 calculates an evaluation value Eval(K). The evaluation value Eval(K) is expressed by Equation (2). A confidence degree Confidence(K) in Equation (2) is expressed by Equation (3). In this equation, K is an integer varying, for example, from 0 to 256.

$$Eval(K) = \sum_{true} w_P \times Confidence(K) + \sum_{true} w_N \times \overline{Confidence(K)} \qquad (2)$$

$$Confidence(K) = \frac{(K \times feat\_A + (256 - K) \times feat\_B)}{256} \qquad (3)$$

That is, in Equation (2), the confidence degrees Confidence (K) between the target image 114 in the reference region 111-0 and the images in the plurality of positive regions 111-1, 111-2, etc. are first confidence degrees. The confidence degrees are the confidence degrees Confidence(K) of the first term of the right side in Equation (2). The confidence degrees Confidence(K) between the target image 114 in the reference region 111-0 and the images in the plurality of negative regions 112-1, 112-2, etc. are second confidence degrees. The confidence degrees are the confidence degrees Confidence(K) of the second term of the right side in Equation (2). The sum of the products of the first confidence and the first weight coefficient $w_P$ of the positive regions 111-1, 111-2, etc. is a first sum of products. The sum of the products of the second confidence and the second weight coefficient $w_N$ of the negative regions 112-1, 112-2, etc. is a second sum of products. The sum of the first sum of products and the second sum of products is the evaluation value Eval(K).

In Equation (3), feat_A is a matching degree of first feature quantity (for example, luminance information) between the target image 114 containing the object to be tracked and the comparison image and feat_B is a matching degree of second feature quantity (for example, color information). Further, K means a mixing ratio between the matching degree feat_A of the first feature quantity and the matching degree feat_B of the second feature quantity. As can be understood from Equation (3), the confidence degree Confidence(K) means the similarity between a comparison image and the target image 114. The comparison image is similar to the target image 114, as the value of the confidence is larger. Of course, other feature quantities other than the luminance information and the color information may be used.

In Equation (2), true of Σ of the first term of the right side means the sum of the products of only Confidence (K) of the positive regions. An image in the positive region 111-J is a comparison image to be compared to the target image 114 when Confidence(K) of the positive region of the first term of the right side in Equation (2) is calculated. Likewise, true of Σ of the second term of the right side means the sum of the products of only Confidence (K) of the negative regions. An image in the negative region 112-J is a comparison image to be compared to the target image 114 when Confidence(K) of the negative region of the second term of the right side in Equation (2) is calculated.

In step S5, the calculating unit 24 calculates a mixing ratio Km in which the evaluation value Eval(K) is the maximum. That is, the evaluation values Eval(K) are calculated by varying the value of the mixing ratio K from 0 to 256. Then, the maximum value is selected from the 257 evaluation values Eval(K) and the mixing ratio Km in which the evaluation Eval(K) is the maximum is determined.

Figure 4:
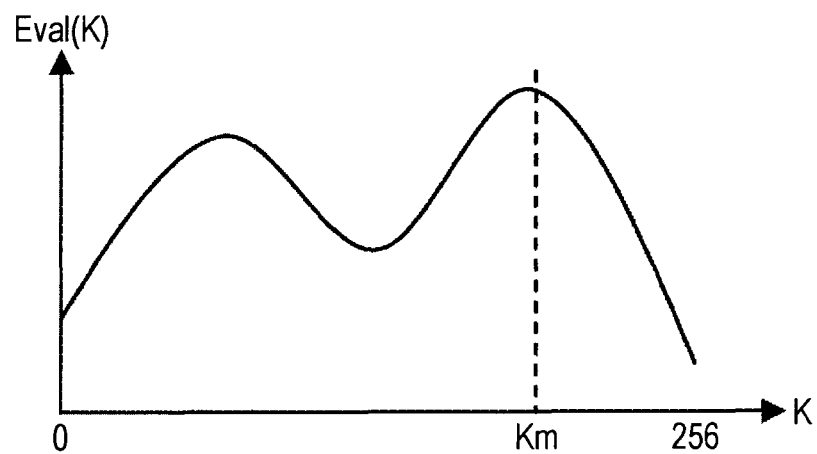
FIG. 4 is a diagram illustrating an evaluation value.

FIG. 4 is a diagram illustrating the evaluation values. As shown in FIG. 4, the evaluation value Eval(K) is varied when the values of the mixing ratio K is sequentially varied from 0 to 256. In the example of FIG. 4, Km is the mixing ratio K in which the evaluation value Eval(K) is the maximum. The mixing ratio Km in which the evaluation value Eval(K) is the maximum is an optimum mixing ratio when the target image 114 containing the object 102 in the frame is detected. As described below in step S8 and step S9, the confidence degree Confidence(K) is calculated using the mixing ratio Km in the subsequent frames. That is, the evaluation value Eval(K) is a function of determining the optimum mixing ratio Km.

Accordingly, in step S6, the setting unit 25 sets the mixing ratio Km calculated in step S5 for the confidence degree Confidence(K) of Equation (3).

Thus, the learning process of the mixing ratio K in the first frame is executed through the processes of step S1 to step S6, and then the tracking process is executed on the second frame in step S7 to step S11.

In step S7, the importing unit 21 imports an image. That is, an image in the frame F2 subsequent to the frame F1 imported in step S1 is read and imported from the storage unit 15.

In step S8, the computing unit 26 scans a scan image on the imported image and calculates the confidence degree Confidence(K) of each scan image. That is, the image in the reference region 111-0 on the frame F1 is determined as the target image 114 through the process of step S2. The scan image in the scan region, which is located at a predetermined position on the current frame (that is, the frame F2 imported in step S7) and has a size corresponding to the size of the target image 114, is extracted as a comparison image to be compared to the target image 114. The matching degree feat_A of the first feature quantity and the matching degree feat_B of the second feature quantity are calculated between the target image 114 and the scan image. The confidence degree Confidence(K) is calculated by applying the calculated matching degree feat_A of the first feature quantity and the calculated matching degree feat_B of the second feature quantity to Equation (3). The value Km set in step S6 is used as the mixing ratio K.

Figure 5:
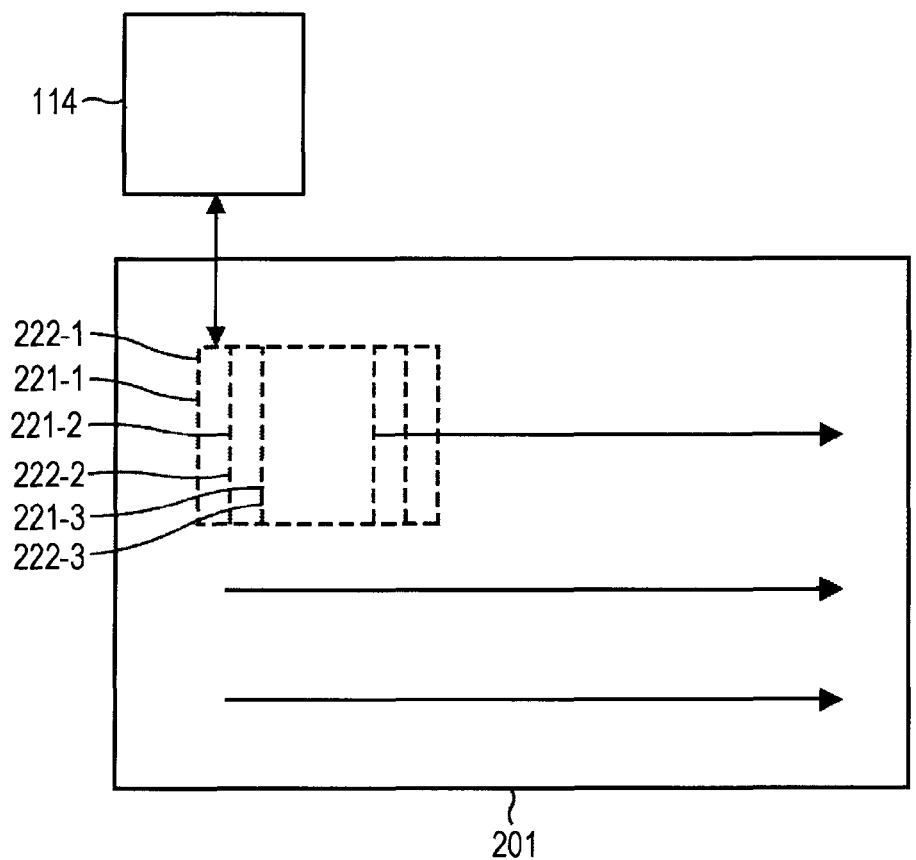
FIG. 5 is a diagram illustrating a scan process.

FIG. 5 is a diagram illustrating the scanning process. As shown in FIG. 5, a scan image 222-1 in a scan region 221-1, which is located at a predetermined position on the frame 201 (that is, the frame F2) imported in step S7, is extracted as a comparison image and is compared to the target image 114 in the previous frame F1 designated in step S2. The size of the scan region 221-1 is the same as the size of the reference region 111-0. That is, the scan image 222-1 has the same size as that of the target image 114. When the value of the mixing ratio K in Equation (3) is set to the maximum value Km, the confidence degrees Confidence(K) of the target image 211 and the scan image 222-1 are calculated.

The comparison region on the frame 201 is sequentially moved as comparison regions 211-1, 211-2, 211-3, etc. and the same process is repeated. The scanning range on the frame 201 may be set to the entire frame 201 or may be set to a range of a predetermined distance from a reference which is the coordinates (that is, the coordinates at which the marker 231 is displayed in the previous process of step S10) of the reference region 111-0 designated in step S2. The calculation amount can be reduced by restricting the scanning range.

In step S9, the detecting unit 27 detects the region at which the confidence degree Confidence(K) is the maximum. That is, the largest confidence degree Confidence(K) is selected from the confidence degrees Confidence(K) of the scan regions 221-J (where J=1, 2, etc.) calculated through the process of step S8, and then a scan region 221-M corresponding to the largest confidence degree Confidence(K) is selected. An image in the scan region 221-M on the frame 201 (the frame F2) is considered as an image 232 corresponding to the target image 114 on the frame 101 (the frame F1). That is, the target image 114 in the reference region 111-0 on the frame 101 is moved to the scan region 221-M on the frame F2 and is determined to be displayed as the image 232 (see FIG. 6 described below).

Figure 6:
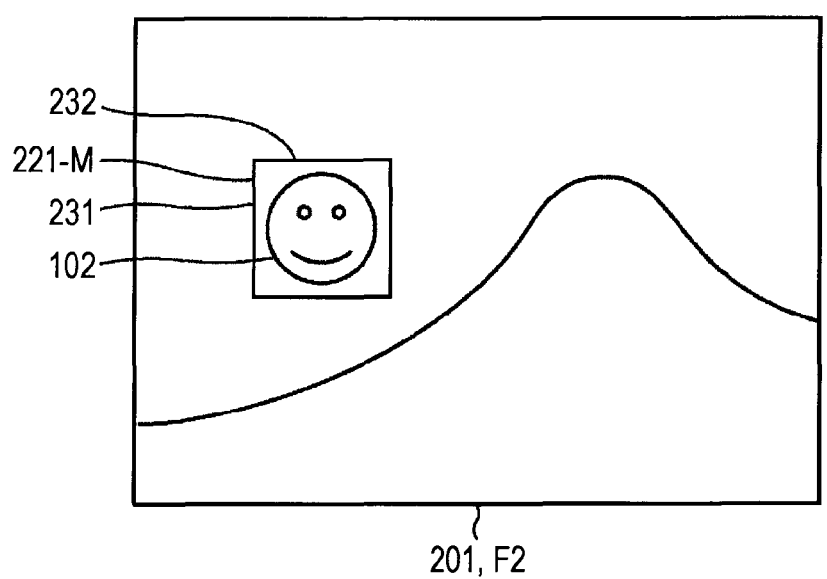
FIG. 6 is a diagram illustrating display of a marker.

In step S10, the display unit 28 displays the marker 231 at the detected position. FIG. 6 is a diagram illustrating the display of the marker 231. In FIG. 6, the image 232 containing the object 102 is displayed in the scan region 221-M. Further, the marker 231 is displayed at the position of the scan region 221-M. That is, the marker 232 is displayed so as to correspond to the image 232. The focusing unit 29 drives and adjusts the lens 12 so that the image 232 being displayed within the marker 231 is focused in the reference. Viewing the marker 231, the user can confirm where the focus is achieved.

In step S11, the determining unit 30 determines whether the tracking process is ended. When the user operates the input unit 14 to give an instruction to interrupt the tracking process, the tracking process is ended.

When the instruction to interrupt the tracking process is not given, the process returns to step S1 and an image of the subsequent frame F3 is imported. Then, in step S2, the regions containing the object are cut out. Since the process of step S10 is not executed in the first frame F1, the reference region 111-0 is set based on the position designated by the user. However, since the coordinates of the image 232 corresponding to the previous target image 114 are currently known in the process of step S10, the region of the subsequent frame 301 at the coordinates corresponding to the region 221-M in which the marker 231 of the frame 201 is being displayed is the new reference region 111-0. Therefore, the regions are cut out with reference to the new reference region.

Figure 7:
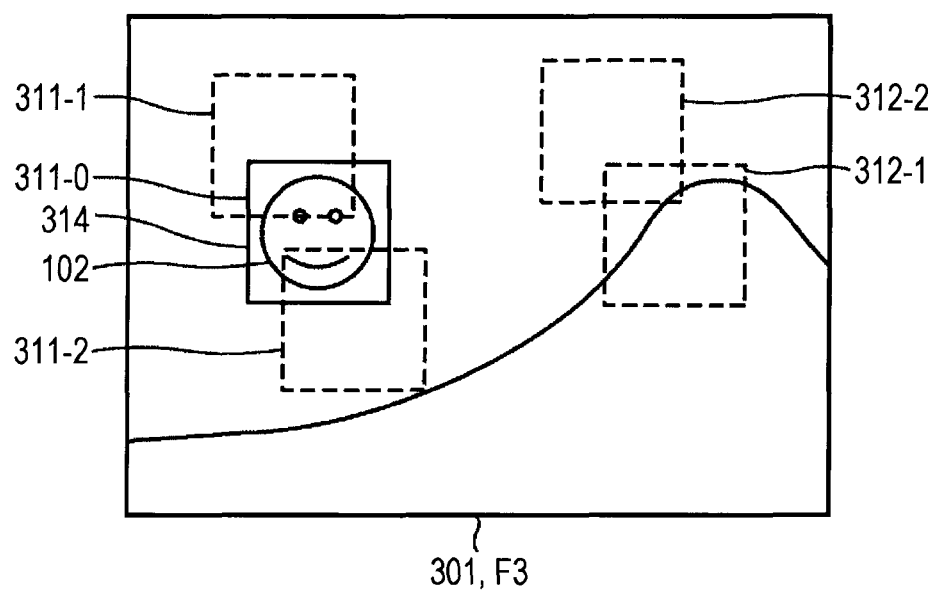
FIG. 7 is a diagram illustrating a process of cutting out regions.

FIG. 7 is a diagram illustrating a second process of cutting out regions. As shown in FIG. 7, a region 311-0 on the frame 301 (that is, the frame F3) newly imported through the second process of step S1 is a region corresponding to the scan region 221-M on the frame 201 (that is, the frame F2) of FIG. 6 which is the immediately previous frame. The region 311-0 is the reference region of the new frame 301 and an image displayed in the region 311-0 is a new target image 314. The cutout unit 22 cuts out new positive regions 311-1, 311-2, etc. and new negative regions 312-1, 312-2, etc. with reference to the new reference region 311-0.

Then, the same process is executed. That is, the image in the region, which corresponds to the coordinates of the image 232 corresponding to the target image 114 of the frame F2, and in the region on the frame F3 subsequent to the frame F2 is the new target image 314, and the evaluation values Eval(K) are calculated for the frame F3. That is, the evaluation values Eval(K) of the new target image 314 and the new positive regions 311-1, 311-2, etc. and the new negative regions 312-1, 312-2, etc. are calculated.

Then, the mixing ratio Km in which the calculated evaluation value Eval(K) is the maximum is calculated. An image on a frame F4 (not shown) subsequent to the frame F3 which corresponds to the new target image 314 of the frame F3 is detected based on the confidence degree Confidence(K) in which the mixing ratio Km is set when the evaluation value Eval(K) is the maximum based on the image of the frame F3.

These processes are repeated for each frame. When the object 102 is moved, the marker 231 tracks the movement destination of the object 102 and is displayed. The processes of step S1 to step S6 are executed for one of the continuous odd frames and the continuous even frames and the processes of step S7 to step S11 are executed for the other thereof.

The second term of the right side in Equation (2) may be omitted. In this case, however, the performance of the tracking function may deteriorate compared to the case where the second term of the right side is not omitted.

The normalization process in Equation (3) may be substituted, that is, the division by a value of 256 may not be executed and (1-K) may be used instead of (256-K).

In step S10, the marker 231 is displayed. However, the driving unit 41 may be driven to pan or tilt the position of the digital camera 1 such that the object 102 is normally located at a predetermined position (for example, the middle of the frame) of the frame.

In the embodiment of the present technology, only the information obtained for each frame is used. For example, since information such as a motion vector obtained from images between a plurality of frames is used or a distance measuring apparatus or the like is not used, the process can be executed rapidly and simply. Since the calculation amount is small, the embodiment of the present technology can be applied to not only digital cameras but also video cameras, monitoring cameras, and other small-sized cheap image processing apparatuses to track an object at real time.

The above-described series of processes may be executed by hardware or software.

When the series of processes is executed by software, a program of the software is stored in the storage unit 15.

In the specification, the program executed by a computer may be a program that executes the processes chronologically in the order described in the specification or may be a program that executes the processes in parallel or at a necessary timing such as a call timing.

Embodiments of the present technology are not limited to the above-described embodiments, but may be modified in various forms without departing from the gist of the present technology.

The embodiments of the present technology may be realized as follows.

(1) An image processing apparatus includes: a calculating unit that calculates an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a first frame, when the mixing ratio is varied and obtains the mixing ratio when the evaluation value is maximum; and a detecting unit that detects an image corresponding to the target image of a second frame based on the confidence degrees in which the mixing ratio is set when the evaluation value is the maximum.

(2) In the image processing apparatus described in (1), the first and second frames are one of an odd frame and an even frame and the other thereof.

(3) The image processing apparatus described in (1) or (2) further includes a computing unit that sets a scan image in a scan region on the second frame as the comparison image and calculates the confidence degree between the target image and the scan image.

(4) In the image processing apparatus described in any one of (1) to (3), the detecting unit detects the scan image, in which the confidence degree between the target image and the scan image are the maximum, as an image corresponding to the target image.

(5) In the image processing apparatus described in any one of (1) to (4), the calculating unit sets an image in a reference region on the first frame as the target image, sets a plurality of regions containing at least a part of the target image in the reference region as positive regions, sets a plurality of regions containing no target image in the reference region as negative regions, calculates first confidence degrees which are the confidence degrees between the target image in the reference region and the images in the plurality of positive regions, calculates second confidence degrees which are the confidence degrees between the target image in the reference region and the images in the plurality of negative regions, calculates a first sum of products which is a sum of products of the first confidence degrees and a first weight coefficient of the positive regions, calculates a second sum of products which is a sum of products of the second confidence degrees and a second weight coefficient of the negative regions, and calculates a sum of the first sum of products and the second sum of products as the evaluation value.

(6) In the image processing apparatus described in any one of (1) to (5), the first weight coefficient is a value obtained by dividing a constant by the number of positive regions and the second weight coefficient is a value obtained by dividing the constant by the number of negative regions.

(7) In the image processing apparatus described in any one of (1) to (6), the calculating unit calculates the evaluation value for a third frame subsequent to the second frame by setting an image in a region, which corresponds to coordinates of an image corresponding to the target image of the second frame, and in a region on the third frame as the new target image and obtains the mixing ratio when the evaluation value is the maximum. The detecting unit detects an image corresponding to the new target image of the third frame on a fourth frame subsequent to the third frame based on the confidence degrees in which the mixing ratio is set when the evaluation value is the maximum based on the image on the third frame.

(8) The image processing apparatus described in any one of (1) to (7) further includes a display unit that displays a marker on a region corresponding to coordinates of the image corresponding to the target image.

(9) The image processing apparatus described in any one of (1) to (8) further includes a driving unit that drives a camera so that the image corresponding to the target image is located at a predetermined position on a screen.

(10) In the image processing apparatus described in any one of (1) to (9), the first feature quantity is luminance information and the second feature quantity is color information.

(11) An image processing method includes: calculating an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a predetermined frame, when the mixing ratio is varied and obtaining the mixing ratio when the evaluation value is maximum; and detecting an image corresponding to the target image based on the confidence degrees in which the mixing ratio is set when the evaluation value is the maximum.

(12) A recording medium records a program that causes a computer to execute a process including: calculating an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a predetermined frame, when the mixing ratio is varied and obtaining the mixing ratio when the evaluation value is maximum; and detecting an image corresponding to the target image based on the confidence degrees in which the mixing ratio is set when the evaluation value is the maximum.

(13) A program causes a computer to execute a process including: calculating an evaluation value, which is expressed as a sum of confidence degrees obtained by mixing, at a predetermined mixing ratio, a matching degree of a first feature quantity and a matching degree of a second feature quantity between a target image containing an object to be tracked and a comparison image which is an image of a comparison region compared to the target image of a predetermined frame, when the mixing ratio is varied and obtaining the mixing ratio when the evaluation value is maximum; and detecting an image corresponding to the target image based on the confidence degrees in which the mixing ratio is set when the evaluation value is the maximum.

The present disclosure contains subject matter related to that disclosed in Japanese Priority Patent Application JP 2011-067138 filed in the Japan Patent Office on Mar. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a calculating unit that calculates an evaluation value, which is expressed as a sum of a first sum of products of a first weight coefficient and a first confidence degrees associated with each of a set of positive regions containing a part of a target image of a first frame containing an object to be tracked, and
   a second sum of products of a second weight coefficient and a second confidence degrees associated with each of a set of negative regions not containing the target image of the first frame, wherein the first confidence degrees and the second confidence degrees are confidence degrees obtained by mixing, at a predetermined mixing ratio, a matching degree of a first feature quantity and a matching degree of a second feature quantity between the target image of the first frame and a comparison image which is an image of a comparison region from a set of comparison regions, wherein the mixing ratio is varied until the evaluation value is maximum, wherein the set of comparison regions is the set of positive regions when calculating the first confidence degrees and the set of comparison regions is the set of negative regions when calculating the second confidence degrees, wherein the first weight coefficient is a value obtained by dividing a constant by a number of positive regions in the set of positive regions and the second weight coefficient is a value obtained by dividing the constant by a number of negative regions in the set of negative regions; and
   a detecting unit that detects a target image of a second frame using a third confidence degrees having a mixing ratio corresponding to the mixing ratio set when the evaluation value is the maximum.

2. The image processing apparatus according to claim 1, wherein the first frame corresponds to one of odd frames and the second frame corresponds to one of even frames.

3. The image processing apparatus according to claim 1, further comprising:
   a computing unit that sets the set of comparison regions as scan regions on the second frame when calculating the third confidence degrees and calculates the third confidence degrees between the target image of the first frame and each scan image corresponding to each of the scan regions on the second frame.

4. The image processing apparatus according to claim 3, wherein the detecting unit detects a scan image, in which the third confidence degrees between the target image of the first frame and the scan image is the maximum, as the target image of the second frame.

5. The image processing apparatus according to claim 1, wherein the calculating unit sets an image in a reference region on the first frame as the target image of the first frame.

6. An image processing apparatus comprising:
   a calculating unit that calculates an evaluation value, which is expressed as a sum of confidence degrees obtained by mixing, at a predetermined mixing ratio, a matching degree of a first feature quantity and a matching degree of a second feature quantity between a target image of a first frame containing an object to be tracked and a comparison image which is an image of a comparison region compared to the target image of the first frame, when the mixing ratio is varied and obtains the mixing ratio when the evaluation value is maximum;

a detecting unit that detects an image corresponding to a target image of a second frame based on the confidence degrees in which the mixing ratio is set when the evaluation value is the maximum, wherein the first and second frames are one of an odd frame and an even frame and the other thereof; and a computing unit that sets a scan image in a scan region on the second frame as the comparison image and calculates the confidence degrees between the target image of the first frame and the scan image, wherein the detecting unit detects the scan image, in which the confidence degrees between the target image of the first frame and the scan image are the maximum, as an image corresponding to the target image of the second frame, wherein the calculating unit sets an image in a reference region on the first frame as the target image of the first frame, sets a plurality of regions containing at least a part of the target image of the first frame in the reference region as positive regions, sets a plurality of regions containing no target image of the first frame in the reference region as negative regions, calculates first confidence degrees which are the confidence degrees between the target image of the first frame in the reference region and the images in the plurality of positive regions, calculates second confidence degrees which are the confidence degrees between the target image of the first frame in the reference region and the images in the plurality of negative regions, calculates a first sum of products which is a sum of products of the first confidence degrees and a first weight coefficient of the positive regions, calculates a second sum of products which is a sum of products of the second confidence degrees and a second weight coefficient of the negative regions, and calculates a sum of the first sum of products and the second sum of products as the evaluation value, wherein the first weight coefficient is a value obtained by dividing a constant by the number of positive regions and the second weight coefficient is a value obtained by dividing the constant by the number of negative regions.

7. The image processing apparatus according to claim 6, wherein the calculating unit calculates the evaluation value for a third frame subsequent to the second frame by setting an image in a region on the third frame, which corresponds to coordinates of the target image of the second frame, as a new target image of the third frame and obtains the mixing ratio when the evaluation value is the maximum, and wherein the detecting unit detects an image corresponding to the new target image of the third frame on a fourth frame subsequent to the third frame based on the confidence degrees in which the mixing ratio is set when the evaluation value corresponding to the third frame is the maximum.

8. The image processing apparatus according to claim 6, further comprising:

a display unit that displays a marker on a region corresponding to coordinates corresponding either to the target image of the first frame or the target image of the second frame.

9. The image processing apparatus according to claim 6, further comprising:

a driving unit that drives a camera so that an image corresponding to the target image of the first frame is located at a predetermined position on a screen.

10. The image processing apparatus according to claim 6, wherein the first feature quantity is luminance information and the second feature quantity is color information.

11. An image processing method comprising:

calculating an evaluation value, which is expressed as a sum of a first sum of products of a first weight coefficient and a first confidence degrees associated with each of a set of positive regions containing a part of a target image of a first frame containing an object to be tracked, and a second sum of products of a second weight coefficient and a second confidence degrees associated with each of a set of negative regions not containing the target image of the first frame, wherein the first confidence degrees and the second confidence degrees are confidence degrees obtained by mixing, at a predetermined mixing ratio, a matching degree of a first feature quantity and a matching degree of a second feature quantity between the target image of the first frame and a comparison image which is an image of a comparison region from a set of comparison regions, wherein the mixing ratio is varied until the evaluation value is maximum, wherein the set of comparison regions is the set of positive regions when calculating the first confidence degrees and the set of comparison regions is the set of negative regions when calculating the second confidence degrees, wherein the first weight coefficient is a value obtained by dividing a constant by a number of positive regions in the set of positive regions and the second weight coefficient is a value obtained by dividing the constant by a number of negative regions in the set of negative regions; and detecting a target image of a second frame using a third confidence degrees having a mixing ratio corresponding to the mixing ratio set when the evaluation value is the maximum.

12. A non-transitory computer readable medium having stored there on a computer program for image processing, wherein the computer program when executed by a computer causes the computer to perform steps of:

calculating an evaluation value, which is expressed as a sum of a first sum of products of a first weight coefficient and a first confidence degrees associated with each of a set of positive regions containing a part of a target image of a first frame containing an object to be tracked and a second sum of products of a second weight coefficient and a second confidence degrees associated with each of a set of negative regions not containing the target image of the first frame, wherein the first confidence degrees and the second confidence degrees are confidence degrees obtained by mixing, at a predetermined mixing ratio, a matching degree of a first feature quantity and a matching degree of a second feature quantity between the target image of the first frame and a comparison image which is an image of a comparison region from a set of comparison regions, wherein the mixing ratio is varied until the evaluation value is maximum, wherein the set of comparison regions is the set of positive regions when calculating the first confidence degrees and the set of comparison regions is the set of negative regions when calculating the second confidence degrees, wherein the first weight coefficient is a value obtained by dividing a constant by a number of positive regions in the set of positive regions and the second weight coefficient is a value obtained by dividing the constant by a number of negative regions in the set of negative regions; and detecting a target image of a second frame using a third confidence degrees having a mixing ratio corresponding to the mixing ratio set when the evaluation value is the maximum.

* * * * *